(12) United States Patent
Kanza et al.

(10) Patent No.: US 11,005,777 B2
(45) Date of Patent: May 11, 2021

(54) SOFTWARE DEFINED PROBER (71) Applicant: AT&T Intellectual Property I, L.P., Atlanta, GA (US)

(72) Inventors: Yaron Kanza, Fair Lawn, NJ (US); Balachander Krishnamurthy, New York, NY (US); Sivaramakrishnan Ramanathan, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 4 days.

(21) Appl. No.: 16/031,502

(22) Filed: Jul. 10, 2018

(65) Prior Publication Data

US 2020/0021536 A1 Jan. 16, 2020

(51) Int. Cl.
*H04L 12/927* (2013.01)
*H04L 12/26* (2006.01)
(Continued)

(52) U.S. Cl.
CPC ............ *H04L 47/805* (2013.01); *H04L 41/12* (2013.01); *H04L 43/0852* (2013.01);
(Continued)

(58) Field of Classification Search
CPC . H04L 43/0852; H04L 43/0823; H04L 43/10; H04L 43/16; H04L 41/5003;
(Continued)

(56) References Cited

U.S. PATENT DOCUMENTS 6,363,056 B1    3/2002  Beigi et al.
7,120,819 B1   10/2006  Gürer et al.
(Continued)

FOREIGN PATENT DOCUMENTS

WO        0191375 A2   11/2001
WO    2015103297 A1    7/2015
(Continued)

OTHER PUBLICATIONS

Henni, D. et al., "Probe-SDN: a smart monitoring framework for SDN-based networks," Global Information Infrastructure and Networking Symposium (GIIS), Oct. 19-21, 2016, 6 pages.
(Continued)

*Primary Examiner* — Jeffrey M Rutkowski
*Assistant Examiner* — Sudesh M Patidar
(74) *Attorney, Agent, or Firm* — Guntin & Gust, PLC; Kenneth Kwan (57) ABSTRACT

In one embodiment, a method includes determining, by one or more processors, a weight of a link between a first node and a second node of a network, wherein the weight is proportional to a probability value of forwarding a probe packet from the first node to the second node of the network. The method also includes adjusting, by the processors, the weight of the link between the first node and the second node using binary exponential backoff. The method further includes determining, by the processors, to forward the probe packet to the second node of the network based on the adjusted weight of the link and one or more field values of the probe packet.

20 Claims, 5 Drawing Sheets

(51) Int. Cl.
*H04L 12/721* (2013.01)
*H04L 12/841* (2013.01)
*H04L 12/911* (2013.01)
*H04L 12/24* (2006.01)
*H04L 12/715* (2013.01)
*H04L 12/707* (2013.01)

(52) U.S. Cl.
CPC .............. *H04L 43/10* (2013.01); *H04L 45/38* (2013.01); *H04L 47/286* (2013.01); *H04L 47/829* (2013.01); *H04L 43/14* (2013.01); *H04L 45/22* (2013.01); *H04L 45/64* (2013.01)

(58) Field of Classification Search
CPC ....... H04L 47/805; H04L 41/12; H04L 43/38; H04L 47/286; H04L 47/829; H04L 43/14; H04L 45/22; H04L 45/64; H04L 47/50; H04L 43/02; H04L 43/022; H04L 43/024; H04L 45/42; H04L 47/29; H04L 47/115; H04L 47/283; H04W 24/06
USPC ......................................................... 370/230
See application file for complete search history.

(56) References Cited

U.S. PATENT DOCUMENTS

| | | | |
|---|---|---|---|
| 9,071,529 B2 | 6/2015 | Garg et al. | |
| 9,419,878 B2 | 8/2016 | Hsiao et al. | |
| 9,531,617 B2 | 12/2016 | Karame | |
| 9,614,757 B2 | 4/2017 | Roeland et al. | |
| 9,654,372 B2 | 5/2017 | Lumezanu et al. | |
| 9,674,071 B2 | 6/2017 | Anand et al. | |
| 9,692,775 B2 | 6/2017 | Zhang | |
| 9,705,775 B2 | 7/2017 | Zhang et al. | |
| 9,742,648 B2 | 8/2017 | Saquib et al. | |
| 9,853,674 B2 | 12/2017 | Chinthalapati et al. | |
| 9,853,877 B2 | 12/2017 | Manghirmalani et al. | |
| 9,860,152 B2 | 1/2018 | Xia et al. | |
| 2006/0143300 A1* | 6/2006 | See .................. | H04L 43/026 709/227 |
| 2011/0176429 A1* | 7/2011 | Johnsson ............. | H04L 43/50 370/241 |
| 2012/0182867 A1* | 7/2012 | Farrag ............... | H04W 28/0236 370/230 |
| 2013/0308463 A1* | 11/2013 | Shinohara ............ | H04L 47/12 370/238 |
| 2014/0025970 A1* | 1/2014 | Shinohara ............ | H04L 45/42 713/320 |
| 2015/0249587 A1 | 9/2015 | Kozat et al. | |
| 2015/0319057 A1* | 11/2015 | Jocha ................. | H04L 43/062 370/241.1 |
| 2016/0112327 A1* | 4/2016 | Morris ............... | H04L 47/127 398/45 |
| 2016/0226742 A1 | 8/2016 | Apathotharanan et al. | |
| 2017/0099217 A1 | 4/2017 | Li et al. | |
| 2017/0223572 A1* | 8/2017 | Lee ................... | H04W 28/08 |
| 2017/0295100 A1* | 10/2017 | Hira .................. | H04L 47/125 |
| 2017/0373950 A1 | 12/2017 | Szilagyi et al. | |
| 2018/0020015 A1 | 1/2018 | Munro et al. | |
| 2018/0048561 A1 | 2/2018 | Bifulco et al. | |
| 2018/0167325 A1* | 6/2018 | Li ..................... | H04L 45/025 |

FOREIGN PATENT DOCUMENTS

| | | |
|---|---|---|
| WO | 2016114750 A1 | 7/2016 |
| WO | 2018049545 A1 | 3/2018 |

OTHER PUBLICATIONS

Van Andrichem, N. L. M. et al., "OpenNetMon: Network Monitoring in OpenFlow Software-Defined Networks," Networks Operations and Management Symposium (NOMS), May 5-9, 2014, 8 pages.

Kim, H. et al., "Improving Network Management with Software Defined Networking," Communications Magazine, vol. 51, Issue: 2, Feb. 14, 2013, pp. 114-119.

Zhang, Y., "An Adaptive Flow Counting Method for Anomaly Detection in SDN," CoNTEXT '13 Proceedings of the ninth ACM Conference on Emerging Networking experiments and technologies, Dec. 9-12, 2013, pp. 25-30.

Basta, A. et al., "Applying NFV and SDN to LTE Mobile Core Gateways; The Functions Placement Problem," AllThingsCellular'14, Aug. 22, 2014, pp. 33-38.

Mehdi, S. A. et al., "Revisiting Traffic Anomaly Detection using Software Defined Networking," RAID'11 Proceedings of the 14th international conference on Recent Advances in Intrusion Detection, Sep. 20-21, 2011, pp. 161-180.

* cited by examiner

SOFTWARE DEFINED PROBER

TECHNICAL FIELD

This disclosure generally relates to a prober, and more specifically to a software defined prober.

BACKGROUND

In communication networks, delay measurements provide valuable information about congestion and other impediments to network traffic. Persistent delays in networks such as wide area networks are often perilous and can adversely affect the effectiveness of online commerce. For example, persistent network delays may adversely affect the stock exchange, the streaming of online games, and other online applications where obstructed data transfer can cause a significant loss of money or disrupt the quality of service.

SUMMARY OF PARTICULAR EMBODIMENTS

According to an embodiment, a method includes determining, by one or more processors, a weight of a link between a first node and a second node of a network, wherein the weight is proportional to a probability value of forwarding a probe packet from the first node to the second node of the network. The method also includes adjusting, by the processors, the weight of the link between the first node and the second node using binary exponential backoff. The method further includes determining, by the processors, to forward the probe packet to the second node of the network based on the adjusted weight of the link and one or more field values of the probe packet.

According to another embodiment, one or more computer-readable non-transitory storage media embodies software that is executable to determine, by one or more processors, a weight of a link between a first node and a second node of a network, wherein the weight is proportional to a probability value of forwarding a probe packet from the first node to the second node of the network. The software is further executable to adjust, by the processors, the weight of the link between the first node and the second node using binary exponential backoff. The software is further executable to determine, by the processors, to forward the probe packet to the second node of the network based on the adjusted weight of the link and one or more field values of the probe packet.

According to yet another embodiment, a system includes one or more processors and a memory coupled to the processors comprising instructions executable by the processors to determine a weight of a link between a first node and a second node of a network, wherein the weight is proportional to a probability value of forwarding a probe packet from the first node to the second node of the network. The instructions are further executable to adjust the weight of the link between the first node and the second node using binary exponential backoff. The instructions are further executable to determine to forward the probe packet to the second node of the network based on the adjusted weight of the link and one or more field values of the probe packet.

A technical advantage of this disclosure is providing a software defined prober (SD prober) that can improve the detection of delays in communication networks in an inexpensive way by using controlled probe packets. A reliable delay measurement may provide information that would reduce operating expenses for an entity, such as a telecommunications provider, by handling problems early. The SD prober may increase efficiency by avoiding the computations of complex routes for probe packets. By monitoring different parts of a network, the SD prober is able to shift more probe packets to areas with a high risk of being congested or having delay issues, which may reduce traffic congestion in the network. The SD prober may reduce measurement costs in comparison to baseline methods that send probe packets via random and shortest paths.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DESCRIPTION OF EXAMPLE EMBODIMENTS

Delay is an important measure of the quality of service provided by networks. For two given nodes in a network (e.g., two switches), the delay is the time it takes for a packet to travel from a first node to a second node. An abnormal delay may adversely affect online applications such as e-commerce, remote control via a network, remote surveillance, and online games. As software-defined networking (SDN) becomes prevalent, and as Open Network Automation Platform (ONAP) evolves, the need for controlled measurement of delay in SDN increases.

A network may be represented as a directed graph where nodes are routers and switches and links are connections between nodes. When the measured delay for a link is higher than expected in comparison to historical delays, the link is referred to as delayed. To measure delay for links of a network, the links may be inspected periodically using probe packets. The rate of inspection for each link should not exceed a given upper bound to prevent a waste of resources and it should not go below a certain lower bound to prevent a case where delays are not detected for a long period of time. Sending probes via fixed predefined paths could be problematic when paths consist of links that should be probed at different rates. Computing a set of paths that satisfies the probe rate constraints is complex, expensive in terms of running times, and inflexible in that any change may require computing a different set.

This disclosure solves this problem by providing a SD prober that routes probe packets stochastically, based on the probe rates, in a random walk fashion. SD prober adaptively measures the delay in SDN with a favorable tradeoff between the cost of the measurement (e.g., the cost of emitting probe packets) and the time taken to detect high delays. SD prober is adaptive in that it uses random walk and changes the probing frequency in different parts of the system based on the delay measurement history. Active measurement tools that measure delays, such as ping and traceroute, are inflexible because they cannot measure the delay experienced on individual links in the network. SD prober is flexible as it uses a SDN controller to guide the probe packets in the network. SD prober uses historical delay measurements to recognize regions in the network that require delay measurements and regions that do not require constant delay measurements and probes delay-prone regions more frequently than the non-delay prone regions.

SD prober combines pseudo-random walk of probe packets with binary exponential backoff to proactively estimate network delays. The probe packets traverse the network in a random walk over a weighted graph. The weights are adapted to route more probe packets to links whose actual probing rate is below a predetermined probing rate and less probe packets to links whose actual probing rate is above a predetermined probing rate. The predetermined probing rates may be the desired minimum and maximum probing rates specified in the probe rate constraints.

Figure 1:
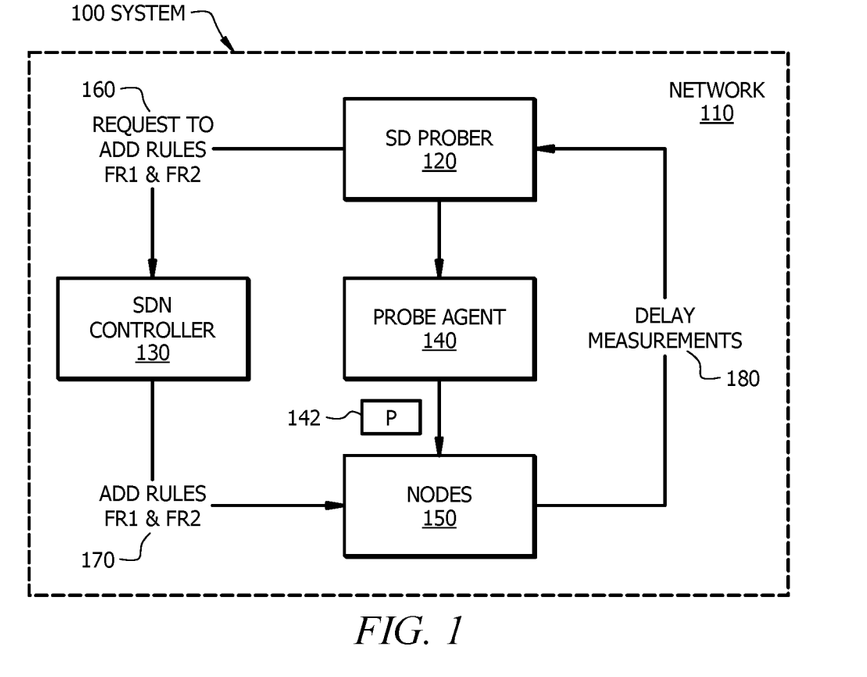
FIG. 1 illustrates an example system for probing a network.
Figure 2:
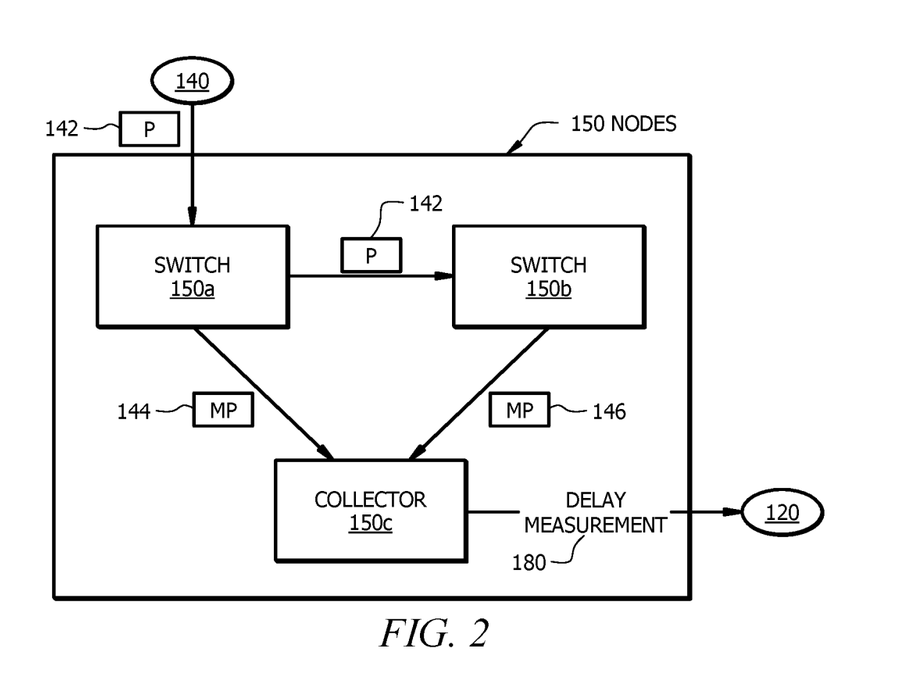
FIG. 2 illustrates example nodes that may be used by the system of FIG. 1.
Figure 3A:
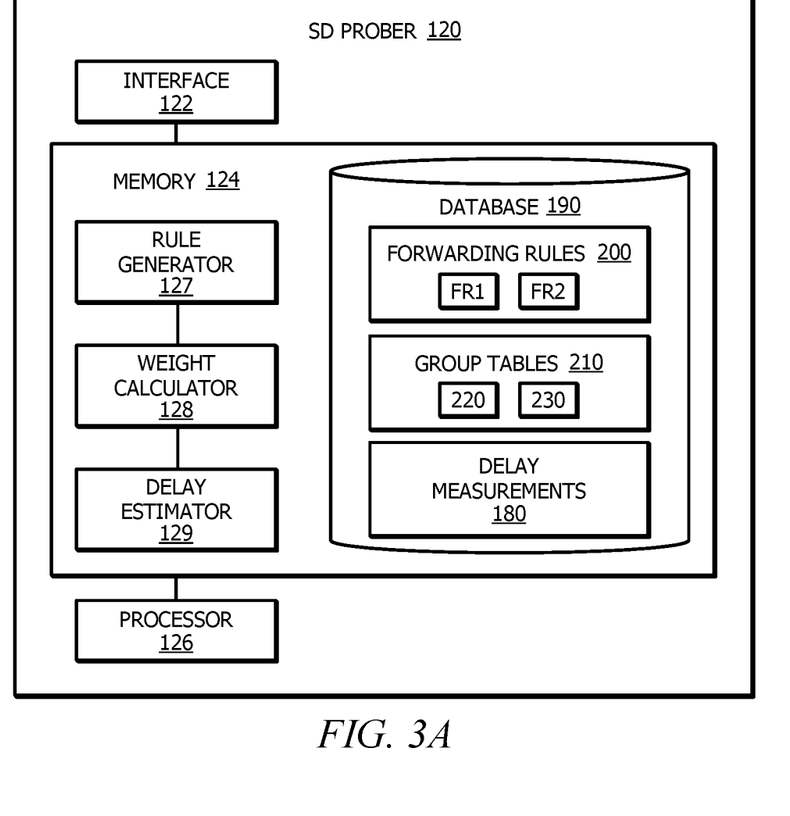
FIG. 3A illustrates an example prober that may be used by the system of FIG. 1.
Figure 3B:
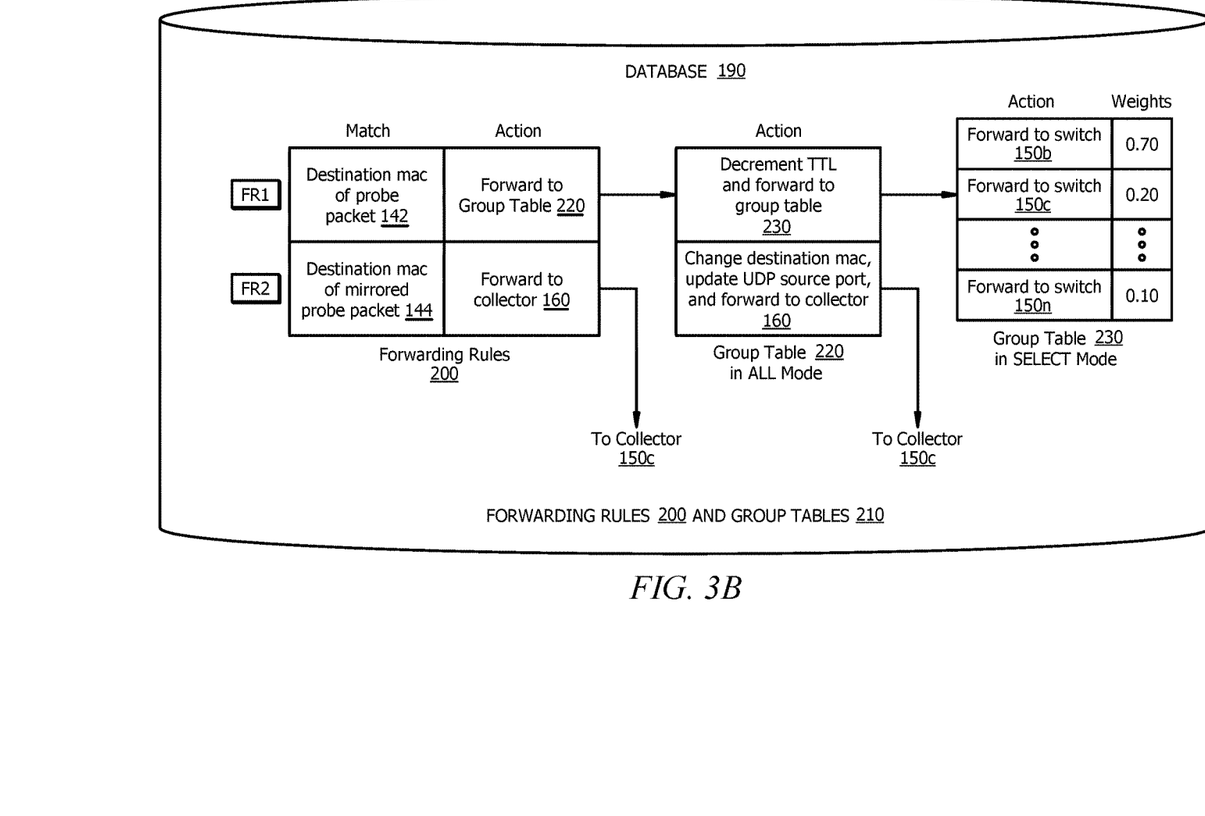
FIG. 3B illustrates an example database that may be used by the prober of FIG. 3A.
Figure 4:
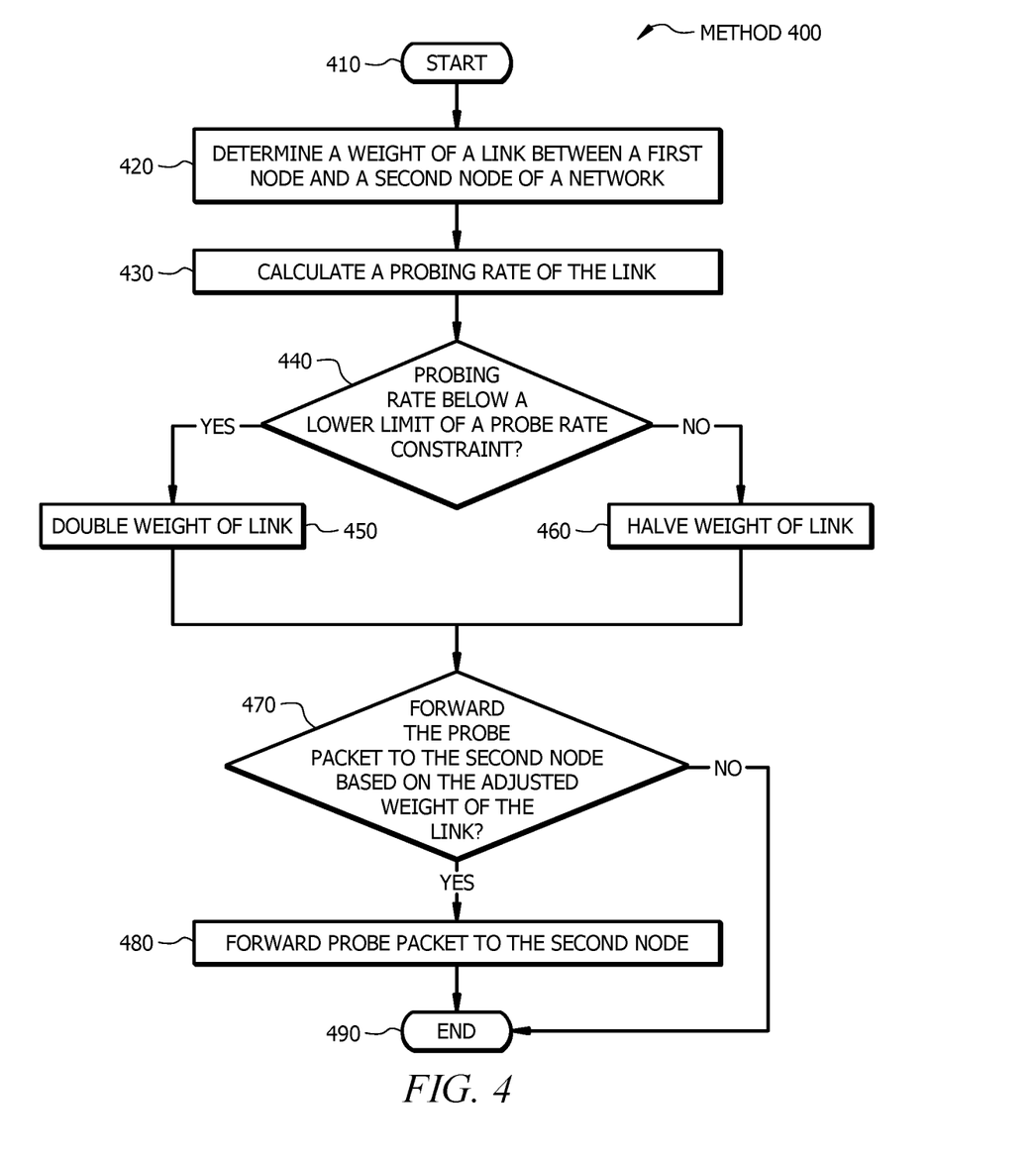
FIG. 4 illustrates an example method for probing a network.
Figure 5:
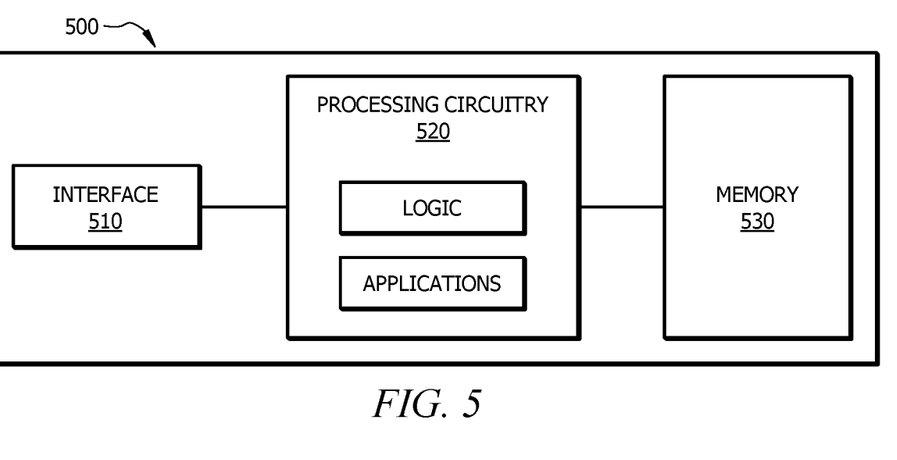
FIG. 5 illustrates an example computer system that may be used by the systems and methods described herein.

FIGS. 1 through 5 show example systems and methods for probing a network. FIG. 1 shows an example system for probing a network and FIG. 2 shows example nodes that may be used by the system of FIG. 1. FIG. 3A shows an example prober that may be used by the system of FIG. 1 and FIG. 3B shows an example database that may be used by the prober of FIG. 3A. FIG. 4 shows an example method for probing a network. FIG. 5 shows an example computer system that may be used by the systems and methods described herein.

FIG. 1 illustrates an example system 100 for probing a network. System 100 of FIG. 1 includes a network 110, a SD prober 120, a SDN controller 130, a probe agent 140, and nodes 150. System 100 or portions thereof may be associated with an entity, which may include any entity, such as a business or company, that probes network 110. The elements of system 100 may be implemented using any suitable combination of hardware, firmware, and software.

Network 110 is a network that utilizes SDN technology. Network 110 may connect SD prober 120, SDN controller 130, probe agent 140, and nodes 150 of system 100. Although this disclosure shows network 110 as being a particular kind of network, this disclosure contemplates any suitable network. One or more portions of network 110 or network 115 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. For example, SD prober 120 may communicate over network 110, including transmitting data to SDN controller 130 or probe agent 140 and receiving data from nodes 150.

SD prober 120 is a component that proactively measures delay in network 110. SD prober 120 uses one or more probe agents 140 to emit probe packets 142 and measure the travel times of probe packets 142 through nodes 150 of network 110. Probe packets 142 are packets created by system 100 to perform measurements. Probe packets 142 differ from ordinary data packets that have a primary task of carrying data between nodes 150 of network 110. Probe packets 142 include headers used by nodes 150 of network 110. Probe packets 142 are routed between nodes 150 of network 110 to measure delays in network 110. Probe packets 142 may be datagrams.

SD prober 120 routes probe packets 142 in a random walk fashion using a combination of match-action forwarding rules and group tables. Prior to system 100 calculating delay measurements 180, SD prober 120 assigns equal weights to each node 150 of network 110. Once system 100 begins calculating delay measurements 180, SD prober iteratively adjusts weights of nodes 150 of network 110 using binary exponential backoff. SD prober 120 randomly selects an initial node of nodes 150 to receive probe packet 142 and uses probe agent 140 to send probe packet 142 to the initial node. The initial node may be selected based on a node weight.

SD prober 120 iteratively adjusts weights of links of network 110 using binary exponential backoff. Links of network 110 are the traversable connections between adjacent nodes 150. Each link weight is proportional to a probability of forwarding probe packet 142 from a first node to a second node of a network 110. SD prober 120 assigns the adjusted weights to the forwarding rules (e.g., FR1 and FR2) and sends a request (see notation 160) to SDN controller 130 to add the forwarding rules to nodes 150. The forwarding rules and group tables, which are used by nodes 150 to determine whether to forward probe packet 142 to one or more nodes 150 of network 110, are described in more detail in FIG. 3B.

SD prober 120 may monitor network 110 from a bird's eye view to detect traffic delay without putting a high load on the system. When a high delay is detected, system 100 zooms in to find links of network 110 that are experiencing the high delay, and the delay on alternative routes is measured to provide information that may help SDN controller 130 (or a human user) decide how to change routing tables to shift traffic to an alternative route. In the event SD prober 120 detects a high delay for a particular link of network 110, SD prober 120 may use a zoom-in feature to estimate the delay of that link. To zoom in and test the delay for the particular link, SD prober 120 may send probe packet 142 from the source node of the link to the target node of the link such that delay measurements 180 are calculated for the link. For evaluating alternative routes, SD prober 120 may send probe packet 142 from the source node of the link to one or more nodes neighboring the target node.

SDN controller 130 of system 100 is an application that manages flow control of nodes 150 of network 110. SDN controller 130 guides probe packets 142 in network 110. Probe packets 142 may be custom probe packets that are treated the same way as data packets in network 110. For example, SDN controller 130 may guide probe packets 142 to different destinations (e.g., nodes) of network 110. SDN controller 130 may add forwarding rules FR1 and FR2 to nodes 150 in response to receiving a request to do so from SD prober 120.

Probe agent 140 of system 100 emits one or more probe packets 142 to nodes 150. Probe agent 140 may send probe packets 142 on a probing route through nodes 150. Probe agent 140 is responsible for crafting and dispatching probe packets 142 by activating probe clients. The number of probe clients may vary. For example, a probe client may be attached to every node 150. Alternatively, a small number of probe clients may be used. Each probe packet 142 may be emitted from a probe client to a destined starting node and continue along a probing route. Probe agent 140 may assign a unique source MAC address to each probe packet 142.

Nodes 150 of system 100 are redistribution points or communication endpoints of network 110. Each node 150 may be a computer system that includes an interface, a memory, and a processor, which may be components of computer system 500. Each node 150 may be an electronic device attached to network 110 that is capable of creating, receiving, or transmitting information over network 110. Nodes 150 may include one or more switches, routers, or collectors. Adjacent nodes 150, also known as neighboring nodes, are nodes that are connected by a single link. Each link represents a communication path between two adjacent nodes 150 of network 110. Links between adjacent nodes 150 may be bidirectional such that a first link spans from a first node to a second node and a second link spans from the second node to the first node.

Although FIG. 1 illustrates a particular arrangement of network 110, SD prober 120, SDN controller 130, probe agent 140, and nodes 150, this disclosure contemplates any suitable arrangement of network 110, SD prober 120, SDN controller 130, probe agent 140, and nodes 150. Two or more of SD prober 120, SDN controller 130, probe agent 140, and nodes 150 may be connected to each other directly, bypassing network 110. Two or more of network 110, SD prober 120, SDN controller 130, probe agent 140, and nodes 150 may be physically or logically co-located with each other in whole or in part. Although FIG. 1 illustrates a particular number of networks 110, SD probers 120, SDN controllers 130, probe agents 140, and nodes 150, this disclosure contemplates any suitable number of networks 110, SD probers 120, SDN controllers 130, probe agents 140, and nodes 150.

In operation, SD prober 120 iteratively adjusts a weight of one or more links of network 110 using binary exponential backoff. Each link weight is proportional to a probability of forwarding probe packet 142 from a first node to a second node of a network 110. SD prober 120 assigns the adjusted link weights to forwarding rules FR1 and FR2. SD prober 120 then sends a request (see notation 160) to SDN controller 130 to add forwarding rules FR1 and FR2 to one or more nodes 150 of system 100, and SD controller 130 adds (see notation 170) forwarding rules FR1 and FR2 to nodes 150 of system 100. SD prober 120 randomly selects an initial node of nodes 150 to receive probe packet 142 and uses probe agent 140 to send probe packet 142 to the initial node. The initial node may be selected based on a node weight. The initial node then chooses to forward probe packet 142 to an adjacent node based on the weight of the link (e.g., a probability value) between the initial node and adjacent node and one or more field values of probe packet 142. The initial node and the adjacent node mirror probe packet 142 upon its arrival and send the mirrored probe packets to a collector node. The collector node calculates delay measurement 180 based on the mirrored probe packets and sends the delay measurement 180 to SD prober 120.

As such, system 100 of FIG. 1 adaptively measures delay in networks, which provides a favorable tradeoff between the cost of the measurement and the time taken to detect high delays.

FIG. 2 illustrates example nodes 150 that may be used by the system of FIG. 1. Specifically, FIG. 2 illustrates how nodes 150 may be used to measure delay in network 110 of FIG. 1. Nodes 150 may represent any data communications equipment (e.g., switches, routers, bridges, modems, or hubs) utilized by network 110 to receive and/or send data (e.g., probe packets 142) along network routes. Nodes 150 of FIG. 2 include switch 150a, switch 150b, and collector 150c. Switches 150a and 150b may be Open vSwitches (OVS) with an OpenFlow programming interface. OVS may be any production quality, multilayer virtual switch licensed under an open source license. Each OVS may be identified by a datapath ID (DPID) known to SDN controller 130 of FIG. 1.

As illustrated in FIG. 2, probe agent 140 sends probe packet 142 to switch 150a. Switch 150a, the initial node, may be selected from nodes 150 of network 110 randomly. The probability of selecting an initial node may be equal to a weight of the initial node divided by the sum of the weights of all nodes 150 of network 110 that are considered for selection. The initial node may be selected as follows. N represents the number of nodes in a network G such that $|V|=n$. Each node $v_i \in V$ has a weight wi. $W=\Sigma_{i=1}^{n} w_i$ is the sum of the weights. The probability of selecting node $v_i$ is $w_i/W$. For each selection of a node, a number x in the range [0,1] is picked uniformly. The i such that $(\Sigma_{j=1}^{i-1} w_j)/W \leq x < (\Sigma_{j=1}^{i} w_j)/W$ is discovered, and $v_i$ is the selected node. The generation of the node weights is described in FIG. 3A below.

When probe packet 142 arrives at switch 150a, probe packet 142 is mirrored to create mirrored probe packet 144. Probe packet 142 is marked to distinguish it from genuine traffic and to associate mirrored probe packets (e.g., mirrored probe packet 144) to their probing task. Each probe packet 142 has a unique identity in its payload. Probe agent 140 then sends probe packet 142 on a path from switch 150a to switch 150b.

When probe packet 142 arrives at switch 150b, probe packet 142 is mirrored to create mirrored probe packet 146. Mirrored probe packets 144 and 146 are sent to collector 150c. Collector 150c records the arrival time of mirrored probe packets 144 and 146, extracts the DPID from the User Datagram Protocol (UDP) source of mirrored probe packets 144 and 146, and retrieves a unique identifier from the payload of the UDP source. Mirrored probe packets 144 and 146 may be grouped by the identifier of probe packet 142. Collector 150c distinguishes groups of mirrored probe packets of different probe packets from one another to reconstruct the path of each probe packet. Mirrored probe packets 144 and 146 are not mirrored on their way to collector 150c. A unique identifier (e.g., a destination MAC address) is assigned to each mirrored probe packet 144 and a different unique identifier (e.g., a different destination MAC address) is assigned to each mirrored probe packet 144 and 146 to avoid mirroring mirrored probe packets 144 and 146. To further restrict the traversal of the probe packets 142, the probe client of switch 150a may set a time to live (TTL) field in the packet header to a pre-defined limit. The TTL represents a number of links (e.g., 10 links) probe packet 142 can travel before probe packet 142 is dropped by a node of network 110.

After grouping mirrored probe packets 144 and 146, collector 150c computes the traversed path of probe packet 142 by ordering mirrored probe packets 144 and 146 based on DPID values and the known topology of network 110. The recorded times of arrival of ordered mirrored probe packets 144 and 146 are used to calculate delay measurement 180 for the link from switch 150a to switch 150b. Collector 150c then sends delay measurement 180 to SD prober 120.

Collector 150c may calculate delay measurement 180 using one or more existing tools, such as ping, traceroute, and timestamp, or a combination thereof. For example, collector 150c may calculate delay measurement 180 between collector 150c and nodes 150 using ping or traceroute to estimate the delay (e.g., by time stamping the probe packet arrival times) and offset this delay with the transmission delay of the links connecting nodes 150. As another example, when all nodes 150 of network 110 support an In-band Network Telemetry (INT) framework and the clocks in nodes 150 are synchronized, an ingress timestamp can be added to mirrored probe packets 144 and 146 at switches 150a and 150b, respectively. Collector 150c can extract these timestamps from the payload of mirrored probe packets 144 and 146 and calculate delay measurement 180 by computing the difference between the timestamps. The calculated delay measurement 180 may represent an estimated time for probe packet 142 to travel from switch 150a to switch 150b.

Although FIG. 2 illustrates a particular arrangement of nodes 150, this disclosure contemplates any suitable arrangement of nodes 150. Switch 150a, switch 150b, and collector 150c may be connected by network 110. Switch 150a, switch 150b, and collector 150c may be connected to each other directly, bypassing network 110. Switch 150a, switch 150b, and collector 150c may be physically or logically co-located with each other in whole or in part. Although FIG. 1 illustrates a particular number of nodes 150, this disclosure contemplates any suitable number of nodes 150. Nodes 150 may include any suitable number of switches 150a and 150b and any suitable number of collectors 150c arranged in any suitable manner.

Although FIG. 2 illustrates a particular number of groups of mirrored probe packets, this disclosure contemplates any suitable number of groups of mirrored probe packets. For example, collector 150c may receive multiple mirrored probe packets generated from multiple probe packets. Collector 150c may group the mirrored probe packets to the associated probe packet based on the identifier of the probe packet. If all mirrored probe packets arrive at collector 150c, then the number of groups is equal to the total number of probe packets, and the number of mirrored probe packets in each group is equal to an initial TTL limit of the associated probe packet. After grouping the mirrored probe packets, collector 150c may compute the traversed path of each probe packet and calculate delay measurements 180 for each link on the path. Collector 150c may then send delay measurements 180 to SD prober 120.

FIG. 3A shows an example SD prober 120 that may be used by the system of FIG. 1. SD prober 120 includes interface 122, memory 124, and processor 126. Memory 124 includes rule generator 127, weight calculator 128, delay estimator 129, and database 190. Database 190 includes forwarding rules 200 (which include forwarding rules FR1 and FR2), group tables 210 (which include group tables 220 and 230), and delay measurements 180.

Interface 122 of SD prober 120 represents any suitable computer element that can receive information from network 110, transmit information through network 110, perform suitable processing of the information, communicate to other components (e.g., SD controller 130) of system 100, or any combination of the preceding. Interface 122 may receive delay measurements 180 from nodes 150 via network 110, for example. Interface 122 may transmit forwarding rules FR1 and FR2 to SDN controller 130, as another example. Interface 122 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 124 of SD prober 120 stores, permanently and/or temporarily, received and transmitted information, as well as system software, control software, other software for SD prober 120, and a variety of other information. Memory 124 may store information for execution by processor 126. Memory 124 stores rule generator 127, weight calculator 128, delay estimator 129, and database 190. Memory 124 includes any one or a combination of volatile or non-volatile local or remote devices suitable for storing information. Memory 124 may include Random Access Memory (RAM), Read-only Memory (ROM), magnetic storage devices, optical storage devices, or any other suitable information storage device or a combination of these devices. Memory 124 may include any suitable information for use in the operation of SD prober 120. Additionally, memory 124 may be a component external to (or may be partially external to) SD prober 120. Memory 124 may be located at any location suitable for memory 124 to communicate with SD prober 120.

Processor 126 of SD prober 120 controls certain operations of SD prober 120 by processing information received from interface 122 and memory 124 or otherwise accessed by processor 126. Processor 126 communicatively couples to interface 122 and memory 124. Processor 126 may include any hardware and/or software that operates to control and process information. Processor 126 may be a programmable logic device, a microcontroller, a microprocessor, any suitable processing device, or any suitable combination of the preceding. Additionally, processor 126 may be a component external to SD prober 120. Processor 126 may be located in any location suitable for processor 126 to communicate with SD prober 120. Processor 126 controls the operation of rule generator 127, weight calculator 128, and delay estimator 129.

Rule generator 127 of SD prober 120 is a computer program that generates forwarding rules 200 (e.g., FR1 and FR2) for SD prober 120. SD prober 120 uses a combination of match-action forwarding rules 200 and group tables 210 (e.g., group tables 220 and 230) in nodes 150 to route probe packets 142 of FIG. 1 through nodes 150 of network 110 in a random walk fashion. Rule generator 127 generates forwarding rule FR1 and FR2, which instruct nodes 150 to forward probe packets (e.g., probe packet 142) and mirrored probe packets to group tables 210 or a collector (e.g., collector 150c of FIG. 2). Forwarding rule FR1 forwards probe packets to group table 220 and forwarding rule FR2 forwards mirrored probe packets to a collector. Forwarding rules 200 and group tables 210 are described in more detail in FIG. 3B. Rule generator 127 receives link weights from weight calculator 128 and assigns the link weights to forwarding rules 200.

Weight calculator 128 of SD prober 120 is a computer program that adjusts weights for links and nodes 150 of network 110. When deciding whether to send probe packet 142 of FIG. 2 from switch 150a to a next node (e.g., switch 150b), the node for the next step is chosen proportionally to the weights assigned to forwarding rule FR1 in table 230. The weights of forwarding rules FR1 and FR2 are proportional to the link-selection probabilities (i.e., the probability of forwarding probe packet 142 from switch 150a to switch 150b). If switch 150a has multiple neighboring nodes (i.e., nodes adjacent to and directly linked to switch 150a), switch 150a may decide to send probe packet 142 to switch 150b if switch 150b has a higher weight (e.g., probability) than the other neighboring nodes.

To adjust the weights for the links and nodes 150 of network 150, the visit probabilities $P_0$ for each node may be calculated. $P_0$ may be a vector such that $P_0[i]$ is the probability of selecting node $v_i$ (e.g., switch 150a of FIG. 2) as the initial node, for $1 \le i \le n$. A transition matrix for network G may be an n×n matrix $M=(p_{ij})_{1\le i, j\le n}$, where $p_{ij}$ is the probability of forwarding probe packet 142 from $v_i$ (e.g., switch 150a) to $v_j$ (e.g., switch 150b). For each node $v_i$ of network 110, the array $(p_{i1},$ and so on, to $p_{in})$ specifies the probabilities for the next step after reaching node $v_i$. Thus, $p_{ij}=0$ if $v_i$ and $v_j$ are not neighbors, and $\Sigma_{j=1}^{n} P_{ij}=1$ for all neighboring nodes.

Given the initial probabilities $P_0$ and a transition matrix M, $P_1=(M)*P_0$ may be the vector of probabilities of reaching each node after one step of the random walk. $P_t=(M)^t*P_0$ denotes the probability of reaching each node after t steps of the random walk. The probability of traversing a link $(v_i, v_j)$ in a random walk of k steps is the probability of reaching node $v_i$ in step t and proceeding to node $v_j$ in step t+1, for some $0 \le t < k$. This probability is denoted by p-traverse$_{ij}$, where p-traverse$_{ij}=\Sigma_{t=0}^{k-1}(P_t)_i*(P_{ij})(P_t)_i$ is the probability of reaching node $v_i$ (e.g., switch 150a) at step t, and $p_{ij}$ is the probability of forwarding probe packet 142 that arrived at node $v_i$ to node $v_j$ (e.g., switch 150b). In this random walk approach, there is no need to compute complex routes for probe packets, and complex computations are not required to craft probe packets or change them as they traverse the weighted graph. If changes to network 110 require adjustments of probe rates, the node weights of the initial node selection or the link weights in the group tables are altered.

Weight calculator 128 adjusts these node and link weights to aid satisfying probe rate constraints. Probe rate constraints are the rates specified by an operator of network 110 for dispatching probe packets 142 of FIG. 1 per link of network 110. Probe rate constraints may vary for different links of network 110. Weight calculator 128 may modify the weights iteratively using binary exponential backoff. The iterations may continue indefinitely as long as SD prober 120 is monitoring network 110.

Probe rate constraints may include minimum and maximum probe rate constraints. A minimum probe rate constraint may be a minimum number of times that a link of network 110 should be probed within a given time period (e.g., 2 times per minute). A maximum probe rate constraint may be a maximum number of times that a link of network 110 should be probed within a given time period (e.g., 4 times per minute). Probe rate constraints assist in balancing the measurement cost and detection time of measuring and detecting delay in network 110.

Weight calculator 128 may double a weight of a link when the probing rate of the link is below a minimum probe rate constraint. For example, consider a link from switch 150a to switch 150b, as shown in FIG. 2, that was inspected during the last minute that SD prober monitored network 110. If a weight of the link is 0.20, a probing rate of the link is 1 time during that last minute, and a minimum probe rate constraint is 2 times per minute, weight calculator 128 may double the weight of the link from 0.20 to 0.10. Increasing the link weight increases the probability of selecting the link in the next iteration.

Weight calculator 128 may halve a weight of a link when the probing rate of the link is above a maximum probing rate. For example, consider a link from switch 150a to switch 150b of network 110 that was inspected during the last minute that SD prober monitored network 110. If a weight of the link is 0.20, a probing rate of the link is 5 times during that last minute, and a maximum probe rate constraint is 4 times per minute, weight calculator 128 may halve the weight of the link from 0.20 to 0.10. Reducing the link weight decreases the probability of selecting the link in the next iteration.

Weight calculator 128 may halve a weight of a link when the probing rate of the link is within the probe rate constraints and when the link was not delayed during the previous iteration. For example, consider a link between switch 150a and 150b of network 110 that was inspected during the last minute that SD prober 120 monitored network 110. If a weight of the link from switch 150a to 150b is 0.20, a probing rate of the link between switch 150a and 150b is 3 times during that last minute, and the minimum and maximum rate constraints are 2 and 4 times per minute, respectively, weight calculator 128 may halve the weight of the link from 0.20 to 0.10. Reducing the link weight decreases the probability of selecting the link in the next iteration.

The weight of each link that was not inspected during the last iteration (e.g., links that were not inspected during the last minute that SD prober 120 monitored network 110) may be multiplied by a predetermined value (e.g., 2 or 4) if the link was delayed during the last k iterations (e.g., 1, 5, or 10 iterations), where the value of k is configurable. The weight of each link that was not inspected during the last iteration may be divided by a predetermined value (e.g., 2 or 4) if the link was not delayed during the last k iterations. Historically delayed links may receive a higher weight than links with no history of delays, so that they are visited more frequently. Weight calculator 128 may determine whether or not each link was delayed based on information received from delay estimator 129.

Weight calculator 128 may modify the weights of nodes 150 to reflect the adjustments in the weights of the links. Weight calculator 128 may double the weight of a node (e.g., switch 150a of FIG. 2) with a link below the minimum probe rate constraint, which increases the chance of probe packet 142 visiting this node during the next iteration. Weight calculator 128 may halve the weight of a node with a link within the minimum and maximum probe rate constraints or above the maximum probe rate constraint, which may prevent traversal via links whose minimum rate constraint is already satisfied. The node weights may be used to select the initial node of the random walk of probe packet 142.

Delay estimator 129 of SD prober 120 estimates delays based on delay measurements 180 received from collector 150c. Delay estimator 129 may determine that a link (e.g., the link between switch 150a and 150b of FIG. 2) is delayed if delay measurement 180 of the link is higher than expected in comparison to historical delays. Otherwise, delay estimator 129 may determine that a link is not delayed. Delay estimator 129 may transmit the estimated link delays to weight calculator 128 so that weight calculator 128 can adjust the link weights based on the estimated link delays. SD prober 120 may learn from the delay history and adjust the number of probe packets 142 that are sent so that parts of network 110 that tend to have multiple delay issues will be monitored more frequently than parts of network 110 that do not have such issues.

Database 190 is any component that can store data associated with system 100. Database 190 may store certain types of information for network 110. Database 190 of SD prober 120 stores forwarding rules 200 (e.g., FR1 and FR2), group tables 210 (e.g., group tables 220 and 230), and delay measurements 180. Databases similar or identical to database 190 may be located in one or more other components of system 100. For example, a similar database may be located in each node 150 of network 110 that stores forwarding rules 200 and group tables 210. Database 190 may store link weights and node weights calculated by weight calculator 128 and delay estimates determined by delay estimator 129 (e.g., historical delay estimates associated with each link of network 110).

Database 190 includes any one or a combination of volatile or non-volatile local or remote devices suitable for storing information. Database 190 may include RAM, ROM, magnetic storage devices, optical storage devices, or any other suitable information storage device or a combination of these devices. Although database 190 is shown separate from SDN controller 130, probe agent 140, and nodes 150 of FIG. 1, database 190 may be located in any location suitable for communication with SDN controller 130, probe agent 140, and nodes 150. Database 190 may be externally located from system 100. Database 190 may be located in SDN controller 130, probe agent 140, and nodes 150. Although described as a database, database 190 may be implemented as any suitable type of volatile or non-volatile memory. Database 190 may include one or more interfaces and/or processors.

Although FIG. 3A illustrates a particular arrangement of interface 122, memory 124, processor 126, rule generator 127, weight calculator 128, delay estimator 129, and database 190, this disclosure contemplates any suitable arrangement of interface 122, memory 124, processor 126, rule generator 127, weight calculator 128, delay estimator 129, and database 190. Two or more of interface 122, memory 124, processor 126, rule generator 127, weight calculator 128, delay estimator 129, and database 190 may be connected to each other directly, bypassing network 110. Two or more of interface 122, memory 124, processor 126, rule generator 127, weight calculator 128, delay estimator 129, and database 190 may be physically or logically co-located with each other in whole or in part. Although FIG. 3A illustrates a particular number of interfaces 122, memories 124, processors 126, rule generators 127, weight calculators 128, delay estimators 129, and databases 190, this disclosure contemplates any suitable number of interfaces 122, memories 124, processors 126, rule generators 127, weight calculators 128, delay estimators 129, and databases 190. Although FIG. 3A illustrates forwarding rules 200, group tables 210, and delay measurements 180 stored in database 190, database 190 may store any suitable data that may be utilized by SD prober 120. For example, forwarding rules 200 and group tables 210 may be adaptable, and database 190 may store multiple versions of forwarding rules 200 and group tables 210.

FIG. 3B shows an example database 190 that may be used by SD prober 120 of FIG. 3A. Specifically, FIG. 3B illustrates a control plane that shows how forwarding rules 200 and group tables 210 of database 190 handle probe packet 142 and mirrored probe packets 144 and 146 of FIG. 2. SD prober 120 may use a combination of match-action Open-Flow forwarding rules 200 and OpenFlow group tables 210 to route probe packets 142 in a random walk fashion through nodes 150 of network 110. OpenFlow group tables 210 are designed to execute one or more buckets for a single match, where each bucket consists of one or more actions (e.g., "Forward to switch 150*b*"). Group tables 210 may be operated in different modes: ALL, SELECT, INDIRECT, and FAST FAILURE. SD prober 120 may use group table 220 in ALL mode and group table 230 in SELECT mode. Group table 220 in ALL mode executes all the buckets (i.e., "Decrement TTL and forward to group table 230" and "Change destination mac, update UDP source port, and forward to collector 150*c*"), and group table 230 in SELECT mode executes a selected bucket (i.e., "Forward to switch 150*b*"). The selection is based on field values of probe packet 142 and weights that are given to the groups. The selection is uniform when the weights are all equal.

SD prober 120 adds two match-action forwarding rules 200, FR1 and FR2, to one or more nodes 150 (e.g., OVS) of network 110. Forwarding rules 200 forward probe packets 142 to group tables 210 or to collector 150*c*. When probe packet 142 arrives at switch 150*a* of FIG. 2, rule FR1 forwards probe packet 142 to group table 220 in ALL mode. Group table 220 in ALL mode contains two buckets. First, mirrored probe packet 144 is created with a unique destination MAC address of mirrored probe packet 144 and a UDP source port equal to the DPID of switch 150*a*. Mirrored probe packet 144 is routed to collector 150*c*. Second, the TTL of probe packet 142 is set to a predefined limit (e.g., 10 steps) and probe packet 142 is forwarded to group table 230 that operates in SELECT mode.

Group table 230 contains multiple buckets consisting of multiple actions. The number of buckets equals the number of nodes neighboring switch 150*a*. Each bucket of group table 230 has a weight representing a probability of forwarding probe packet 142 to the next node (i.e., switch 150*b*, switch 150*c*, and so on to switch 150*n*). The first bucket containing the action "Forward to switch 150*b*" has a weight of 0.70, the second bucket containing the action "Forward to switch 150*c*" has a weight of 0.20, and so on until the nth bucket containing the action "Forward to switch 150*n*" has a weight of 0.10. For example, if 100 probe packets are sent through switch 150*a*, 70 probe packets are expected to go to switch 150*b*, 20 packets are expected to go to switch 150*c*, and 10 probe packets are expected to go to switch 150*n*. Because the weight of the first bucket is greater than the weight of the other two buckets, the probability (i.e., 70 percent) of forwarding probe packet 142 to switch 150*b* is higher than the probability (e.g., 20 percent or 10 percent) of forwarding probe packet 142 to switches 150*c* or 150*n*. For each forwarded probe packet 142, the node that receives the probe packet (e.g., switch 150*a* of FIG. 2) chooses a bucket and executes the actions in the bucket.

Each bucket contains a forwarding rule to a different neighbor node. For example, switch 150*a* of FIG. 2 may hash several probe packet fields to arbitrarily choose a bucket in group table 230 proportional to the weights. The hash values are cached by switch 150*a* to uniformly select buckets per each flow. Probe packet headers may include one or more of the following fields: a source and destination media access control (MAC) address, a source and destination Internet Protocol address (e.g., an IPv4 or an IPv6 address), a virtual local area network (VLAN) identity (ID), an ethernet type, and/or a value indicating a protocol (e.g., a User Datagram Protocol (UDP)).

To add randomness to the bucket selection, probe agent 140 assigns a unique source MAC address to each probe packet 142. In repeating visits of probe packet 142 at a node 150, the same actions are applied at each visit. Hence, the traversal is a pseudo-random walk. A real random walk may be implemented by applying rules that take the TTL into account, but applying these rules requires adding more rules to each node 150, which can be expensive and unnecessary. When a mirrored probe packet arrives at a node (e.g., switch 150*a*), match-action rule FR2 forwards the mirrored probe packet to a collector (e.g., collector 150c), which prevents the unnecessary mirroring of already mirrored packets.

The combination of forwarding rules 200 and group tables 210 of database 190 allows SD prober 120 to route probe packets 142 more frequently to areas where traffic congestion tends to occur in network 110 without computing complex routes for probe packets 142.

FIG. 4 shows an example method for probing a network. Method 400 begins at step 410. At step 420, one or more processors (e.g., processor 126 of SD prober 120) determines a weight of a link between a first node (e.g., switch 150a) and a second node (e.g., switch 150b) of a network (e.g., network 110). At step 430, the processors calculate a probing rate of the link. The probing rate may be the number of times the link was inspected during the last iteration. At step 440, the processors determine whether the calculated probing rate is below a lower limit of a probe rate constraint. If the processors determine that the calculated probing rate is below the lower limit of the probe rate constraint, method 400 advances to step 450, where the processors double the weight of the link. If the processors determine that the calculated probing rate is not below the lower limit of the probe rate constraint, method 400 advances to step 460, where the processors halve the weight of the link.

Method 400 then moves to step 470, where the processors determine whether to forward a probe packet from the first node to the second node based at least in part on the adjusted weight of the link. For example, the link between the first and second node may have an adjusted weight of 0.70, which represents a 70 percent probability of forwarding the probe packet from the first node to the second node. If the weight of the link between the first node and the second node (e.g., 0.70) is greater than the weights of the links between the first node and any other node neighboring the first node (e.g., a link weight of 0.10 for a link from the first node to a third node, and a link weight of 0.20 for a link from the first node to a fourth node), then the processors may determine to forward the probe packet from the first node to the second node.

If the processors determine to forward the probe packet to the second node, method 400 advances to step 480, where the first node forwards the probe packet to the second node. If the processors determined not to forward the probe packet to the second node, method 400 moves to step 490, where method 400 ends.

Modifications, additions, or omissions may be made to method 400 depicted in FIG. 4. Method 400 may include more, fewer, or other steps. For example, method 400 may include determining whether to forward the probe packet to a third node. As another example, method 400 may include determining a weight of the first node and doubling or halving the weight of the first node based on the adjusted weight of the link. As still another example, method 400 may include determining the weights of links between the first node and all nodes neighboring the first node and then determining to forward the probe packet to the neighboring node with the highest weight. Steps may also be performed in parallel or in any suitable order. While discussed as specific components completing the steps of method 400, any suitable component of system 100 may perform any step of method 400.

FIG. 5 shows an example computer system that may be used by the systems and methods described herein. For example, any of network 110, SD prober 120, SDN controller 130, probe agent 140, and nodes 150 of FIG. 1 may include one or more interface(s) 510, processing circuitry 520, memory(ies) 530, and/or other suitable element(s).

Interface 510 (e.g., interface 122 of FIG. 3A) receives input, sends output, processes the input and/or output, and/or performs other suitable operation. Interface 510 may comprise hardware and/or software.

Processing circuitry 520 (e.g., processor 126 of FIG. 3A) performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 (e.g., memory 124 of FIG. 3A) may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   determining, by one or more processors, a weight of a link between a first node and a second node of a network, wherein the weight is proportional to a probability value of forwarding a probe packet from the first node to the second node of the network;
   adjusting, by the processors, the weight of the link between the first node and the second node using binary exponential backoff, wherein the adjusting the weight of the link comprises calculating a probing rate of the link, determining that the probing rate of the link is below a minimum probe rate constraint, and increasing the weight of the link based on a determination that the probing rate of the link is below the minimum probe rate constraint, wherein the minimum probe rate constraint represents a minimum number of times to probe the link within a certain period of time;
   assigning, by the processors, the adjusted weight of the link to one or more forwarding rules; and
   determining, by the processors, to forward the probe packet to the second node of the network based on the adjusted weight of the link, the one or more forwarding rules, and one or more field values of the probe packet, wherein a first forwarding rule of the one or more forwarding rules forwards the probe packet to a group table and a second forwarding rule of the one or more forwarding rules forwards a mirrored probe packet of the probe packet to a collector node.

2. The method of claim 1, wherein:
   the first node and the second node are switches;
   the link is a traversable connection from the first node to the second node;
   the one or more field values of the probe packet include one or more of the following:
      a media access control (MAC) address;
      an Internet Protocol (IP) address;
      a virtual local area network (VLAN) identity (ID); and
      an ethernet type.

3. The method of claim 1, wherein the increasing the weight of the link comprises doubling, by the processors, the weight of the link based on the determination that the probing rate of the link is below the minimum probe rate constraint, and wherein adjusting the weight of the link between the first node and the second node using binary exponential backoff further comprises:
   doubling, by the processors, a weight of the second node based on the determination that the probing rate of the link is below the minimum probe rate constraint;
   wherein:
      the minimum probe rate constraint is specified by an operator of the network to avoid not detecting for delays in the network for an extended period of time; and
      doubling the weight of the link increases the probability value of forwarding the probe packet to the second node of the network.

4. The method of claim 1, further comprising randomly selecting, by the processors, the first node of the network to receive the probe packet from a plurality of nodes of the network, wherein a second probability value of randomly selecting the first node is proportional to a weight of the first node divided by a sum of weights of all nodes in the network, and wherein the adjusting the weight of the link is based on the second probability value of randomly selecting the first node and a transition matrix associated with all nodes of the network.

5. The method of claim 1, further comprising decrementing, by the processors, a time to live (TTL) of the probe packet, wherein the TTL represents a number of links the probe packet can travel before the probe packet is dropped by a node of the network.

6. The method of claim 1, further comprising receiving, by one or more interfaces, a delay measurement for the link, wherein the delay measurement represents an estimated time for the probe packet sent from the first node to arrive at the second node, wherein the adjusting the weight of the link further comprises determining that the probing rate of the link is above a maximum probe rate constraint, and decreasing the weight of the link based on a determination that the probing rate of the link is above the maximum probe rate constraint, wherein the maximum probe rate constraint represents a maximum number of times to probe the link within the certain period of time.

7. The method of claim 1, further comprising:
   mirroring, by the processors, the probe packet to create the mirrored probe packet, wherein the probe packet and the mirrored probe packet comprise identical destination MAC addresses;
   changing, by the processors, a destination MAC address of the mirrored probe packet to a different destination MAC address; and
   forwarding, by one or more interfaces, the mirrored probe packet to the collector node, wherein changing the destination MAC address of the mirrored probe packet prevents the mirrored probe packet from being mirrored during transmission to the collector node.

8. One or more computer-readable, non-transitory storage media embodying software that, when executed by a processor, causes the processor to:
   determine a weight of a link between a first node and a second node of a network, wherein the weight is proportional to a probability value of forwarding a probe packet from the first node to the second node of the network;
   adjust the weight of the link between the first node and the second node using binary exponential backoff, wherein the adjusting the weight of the link comprises calculating a probing rate of the link, determining that the probing rate of the link is below a minimum probe rate constraint, and increasing the weight of the link based on a determination that the probing rate of the link is below the minimum probe rate constraint, wherein the minimum probe rate constraint represents a minimum number of times to probe the link within a certain period of time;

assign the adjusted weight of the link to one or more forwarding rules; and determine to forward the probe packet to the second node of the network based on the adjusted weight of the link, the one or more forwarding rules, and one or more field values of the probe packet, wherein a first forwarding rule of the one or more forwarding rules forwards the probe packet to a group table and a second forwarding rule of the one or more forwarding rules forwards a mirrored probe packet of the probe packet to a collector node.

9. The one or more computer-readable, non-transitory storage media of claim 8, wherein:

the first node and the second node are switches;

the link is a traversable connection from the first node to the second node; and the one or more field values of the probe packet include one or more of the following:
 a media access control (MAC) address;
 an Internet Protocol (IP) address;
 a virtual local area network (VLAN) identity (ID); and
 an ethernet type.

10. The one or more computer-readable, non-transitory storage media of claim 8, wherein the increasing the weight of the link comprises doubling the weight of the link based on the determination that the probing rate of the link is below the minimum probe rate constraint, and wherein adjusting the weight of the link between the first node and the second node using binary exponential backoff further comprises:

doubling a weight of the second node based on the determination that the probing rate of the link is below the minimum probe rate constraint;

wherein:
 the minimum probe rate constraint is specified by an operator of the network to avoid not detecting for delays in the network for an extended period; and
 doubling the weight of the link increases the probability value of forwarding the probe packet to the second node of the network.

11. The one or more computer-readable, non-transitory storage media of claim 8, the software further executable to randomly select the first node of the network to receive the probe packet from a plurality of nodes of the network, wherein a probability value of randomly selecting the first node is proportional to a weight of the first node divided by a sum of weights of all nodes in the network.

12. The one or more computer-readable, non-transitory storage media of claim 8, the software further executable to decrement a time to live (TTL) of the probe packet, wherein the TTL represents a number of links the probe packet can travel before the probe packet is dropped by a node of the network.

13. The one or more computer-readable, non-transitory storage media of claim 8, the software further executable to receive a delay measurement for the link, wherein the delay measurement represents an estimated time for the probe packet sent from the first node to arrive at the second node.

14. The one or more computer-readable, non-transitory storage media of claim 8, the software further executable to:

mirror the probe packet to create the mirrored probe packet, wherein the probe packet and the mirrored probe packet comprise identical destination MAC addresses;

change the destination MAC address of the mirrored probe packet to a different destination MAC address; and forward the mirrored probe packet to the collector node, wherein changing the destination MAC address of the mirrored probe packet prevents the mirrored probe packet from being mirrored during transmission to the collector node.

15. A system comprising one or more processors and a memory coupled to the processors comprising instructions executable by the processors to:

determine a weight of a link between a first node and a second node of a network, wherein the weight is proportional to a probability value of forwarding a probe packet from the first node to the second node of the network;

adjust the weight of the link between the first node and the second node using binary exponential backoff, wherein the adjusting the weight of the link comprises calculating a probing rate of the link, determining that the probing rate of the link is below a minimum probe rate constraint, and increasing the weight of the link based on a determination that the probing rate of the link is below the minimum probe rate constraint, wherein the minimum probe rate constraint represents a minimum number of times to probe the link within a certain period of time;

assign the adjusted weight of the link to one or more forwarding rules; and determine to forward the probe packet to the second node of the network based on the adjusted weight of the link, the one or more forwarding rules, and one or more field values of the probe packet, wherein a first forwarding rule of the one or more forwarding rules forwards the probe packet to a group table and a second forwarding rule of the one or more forwarding rules forwards a mirrored probe packet of the probe packet to a collector node.

16. The system of claim 15, wherein:

the first node and the second node are switches;

the link is a traversable connection from the first node to the second node; and the one or more field values of the probe packet include one or more of the following:
 a media access control (MAC) address;
 an Internet Protocol (IP) address;
 a virtual local area network (VLAN) identity (ID); and
 an ethernet type.

17. The system of claim 15, wherein the increasing the weight of the link comprises doubling the weight of the link based on the determination that the probing rate of the link is below the minimum probe rate constraint, and wherein adjusting the weight of the link between the first node and the second node using binary exponential backoff further comprises:

doubling a weight of the second node based on the determination that the probing rate of the link is below the minimum probe rate constraint;

wherein:
 the minimum probe rate constraint is specified by an operator of the network to avoid not detecting for delays in the network for an extended period; and
 doubling the weight of the link increases the probability value of forwarding the probe packet to the second node of the network.

18. The system of claim 15, the instructions further executable by the processors to randomly select the first node of the network to receive the probe packet from a plurality of nodes of the network, wherein a second probability value of randomly selecting the first node is proportional to a weight of the first node divided by a sum of weights of all nodes in the network.

19. The system of claim 15, the instructions further executable by the processors to decrement a time to live (TTL) of the probe packet, wherein the TTL represents a number of links the probe packet can travel before the probe packet is dropped by a node of the network.

20. The system of claim 15, the instructions further executable by the processors to receive a delay measurement for the link, wherein the delay measurement represents an estimated time for the probe packet sent from the first node to arrive at the second node.

* * * * *